Aug. 5, 1958 J. M. ALEXANDER 2,846,065
HARDNESS GAUGE
Filed Dec. 15, 1954 7 Sheets-Sheet 1

INVENTOR.
JAMES M. ALEXANDER
BY
Raymond N. Matson
AGENT

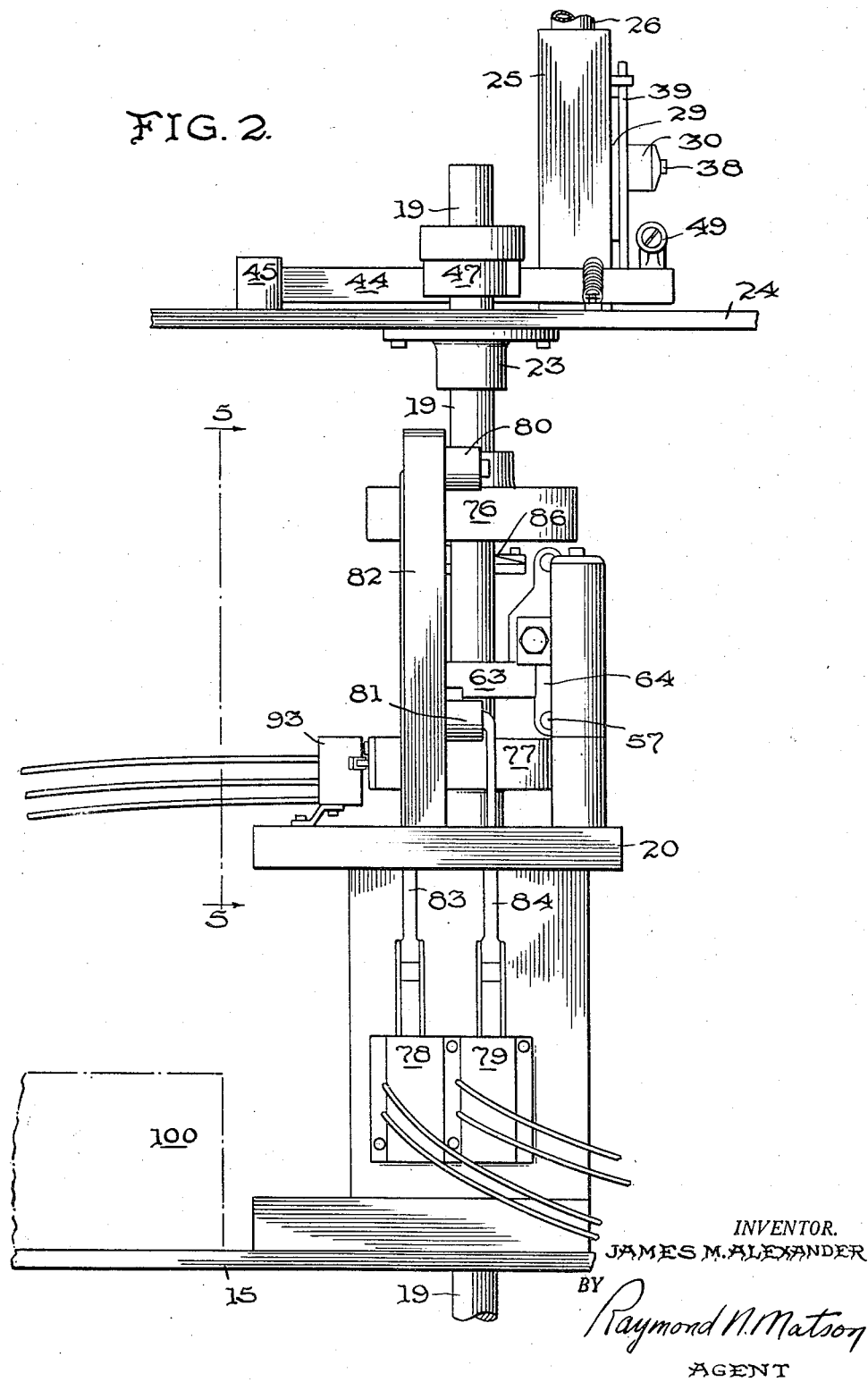

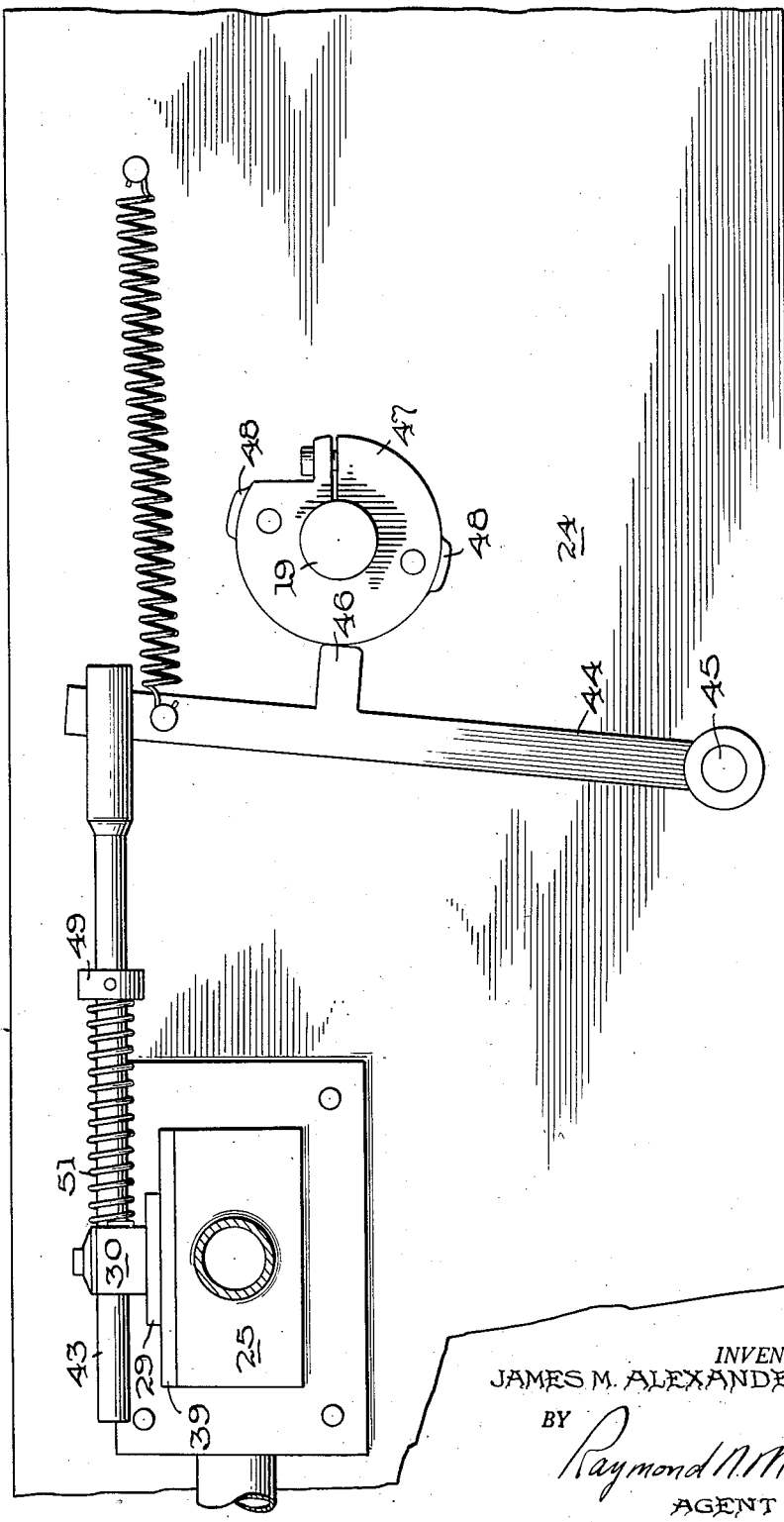

Aug. 5, 1958 J. M. ALEXANDER 2,846,065
HARDNESS GAUGE
Filed Dec. 15, 1954 7 Sheets-Sheet 4
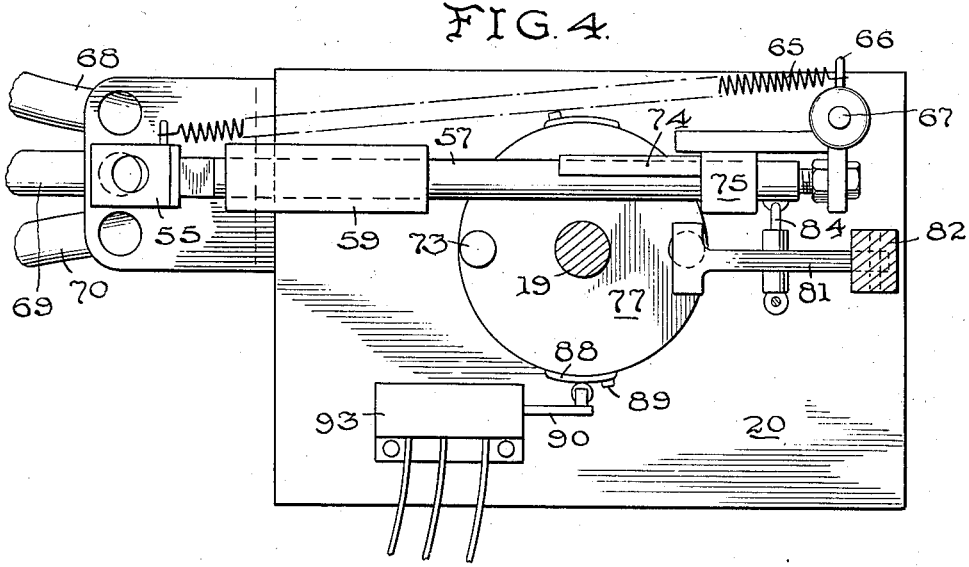
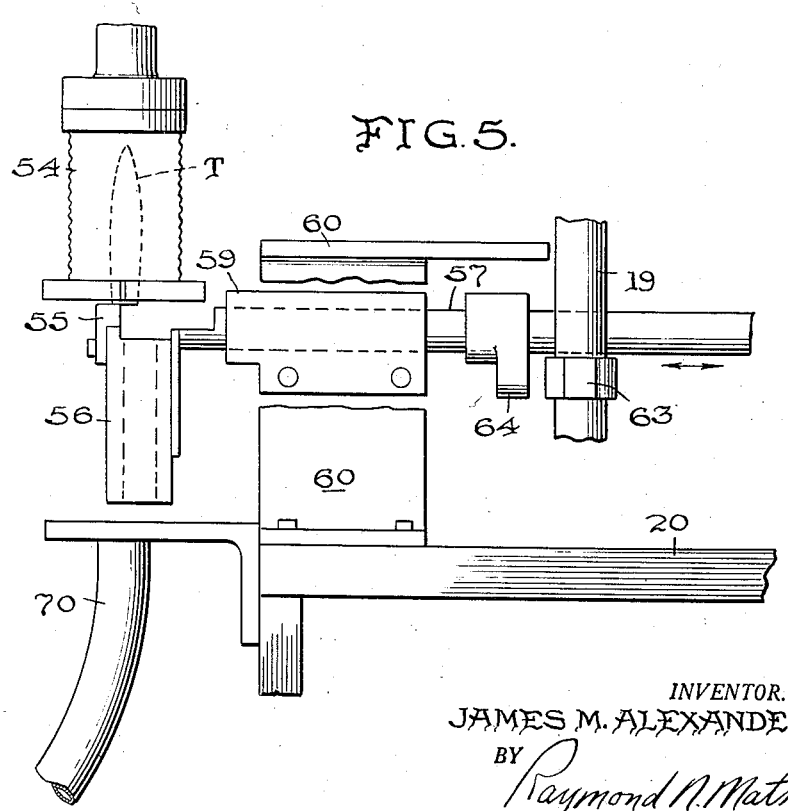
INVENTOR.
JAMES M. ALEXANDER
BY
Raymond N. Matson
AGENT Aug. 5, 1958  J. M. ALEXANDER  2,846,065
HARDNESS GAUGE
Filed Dec. 15, 1954  7 Sheets-Sheet 5
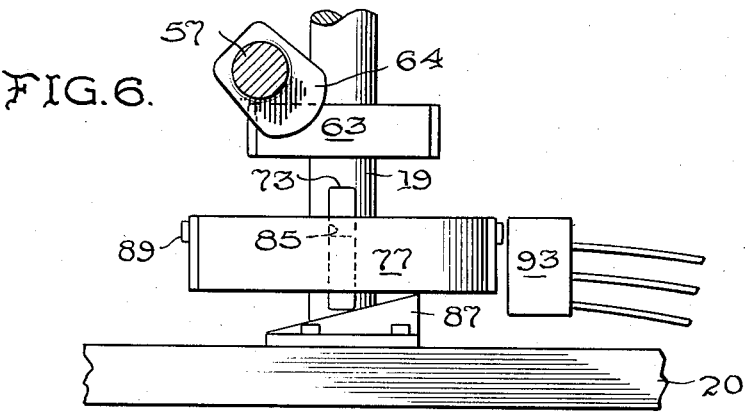
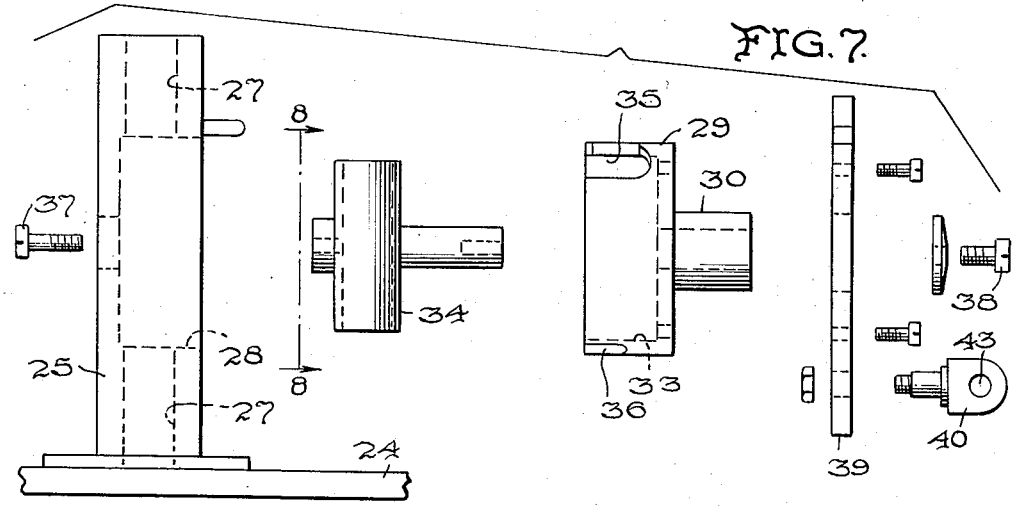
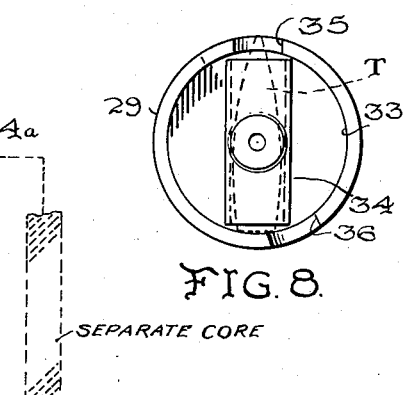
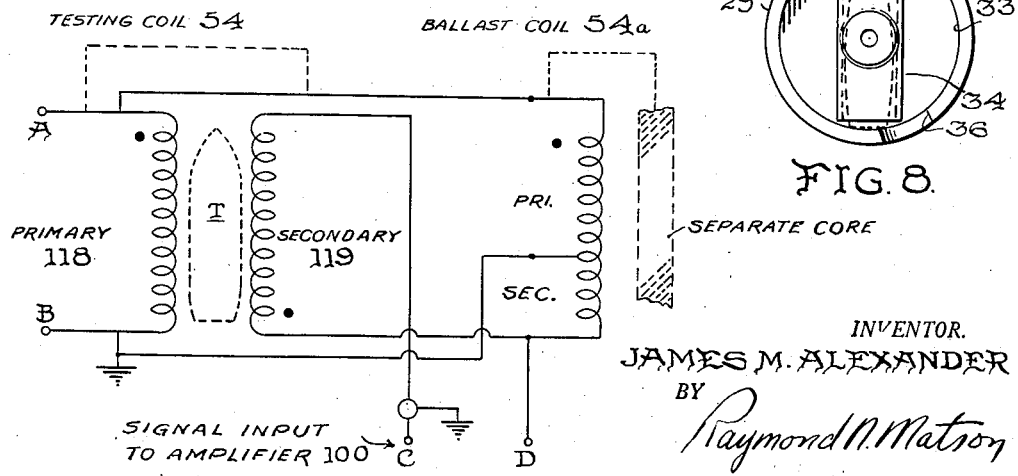
INVENTOR.
JAMES M. ALEXANDER
BY
Raymond N. Matson
AGENT United States Patent Office 2,846,065
Patented Aug. 5, 1958

2,846,065

HARDNESS GAUGE

James M. Alexander, Parsons, Kans.

Application December 15, 1954, Serial No. 475,500

10 Claims. (Cl. 209—81)

This invention relates generally to an apparatus for testing metals and more particularly to an apparatus for automatically testing metal parts of various types and their varying degrees of hardness and at the same time in some instances checking for defects, by electronic non-destructive means.

Apparatus of this general type are known in the art but are usually characterized by a number of inherent, disadvantageous features. Among these are a lack of flexibility in use in that testing is restricted to pieces of certain configurations or dimensions, to surface defects or to interior defects or characteristics; a limited ability to test pieces but not to sort, mark and grade them after or during such tests; ineffective signalling means which ineffectually indicate the results of a specific test; an inefficient rate of testing resulting in an uneconomic and impractical testing apparatus; and in an unnecessarily high initial and subsequent maintenance cost of the testing apparatus.

Accordingly, the chief object of the present invention is to provide an improved testing apparatus which will obviate the disadvantages characterizing known, prior structures.

Another important object of the present invention is to provide an improved electronic testing apparatus which automatically and with greater speed and accuracy tests a variety of types of metallic pieces for hardness.

Another important object of the present invention is to provide an improved testing apparatus which automatically and with greater speed and accuracy tests a variety of types of metallic pieces for folds, seams, inclusions, porosity, cracks, surface defects and/or other imperfections, at the same time tests are being made for hardness.

A further important object of the present invention is to provide an improved signal translating system for utilizing minute variations in electrical potential to control the sorting mechanism.

Another important object of this present invention is to provide a multi-channel amplifier affording a broad range of control of the resultant conversion to mechanical energy.

Other objects and advantages of the present invention will become apparent during the course of the following description.

In the drawings I have shown one embodiment of the invention. In this showing:

Figure 2 is an end elevational view thereof to an enlarged scale looking from the right in Figure 1;

Figure 3 is a partial top plan view thereof to an enlarged scale;

Figure 4 is a horizontal sectional view of the apparatus taken on the line 4—4 of Figure 1, parts being shown in plan;

Figure 5 is a fragmentary front elevational view of the apparatus, parts being broken away, taken on the line 5—5 of Figure 2.

Figure 6 is a fragmentary elevational view taken on the line 6—6 of Figure 1;

Figure 7 is an exploded detail view of the intermittent parts feeder comprising a part of the present invention;

Figure 8 is an elevational view of one of the parts thereof showing a test piece in position for testing;

Figure 10 is a schematic diagram illustrating the relationship of the test coils.

Figure 1:
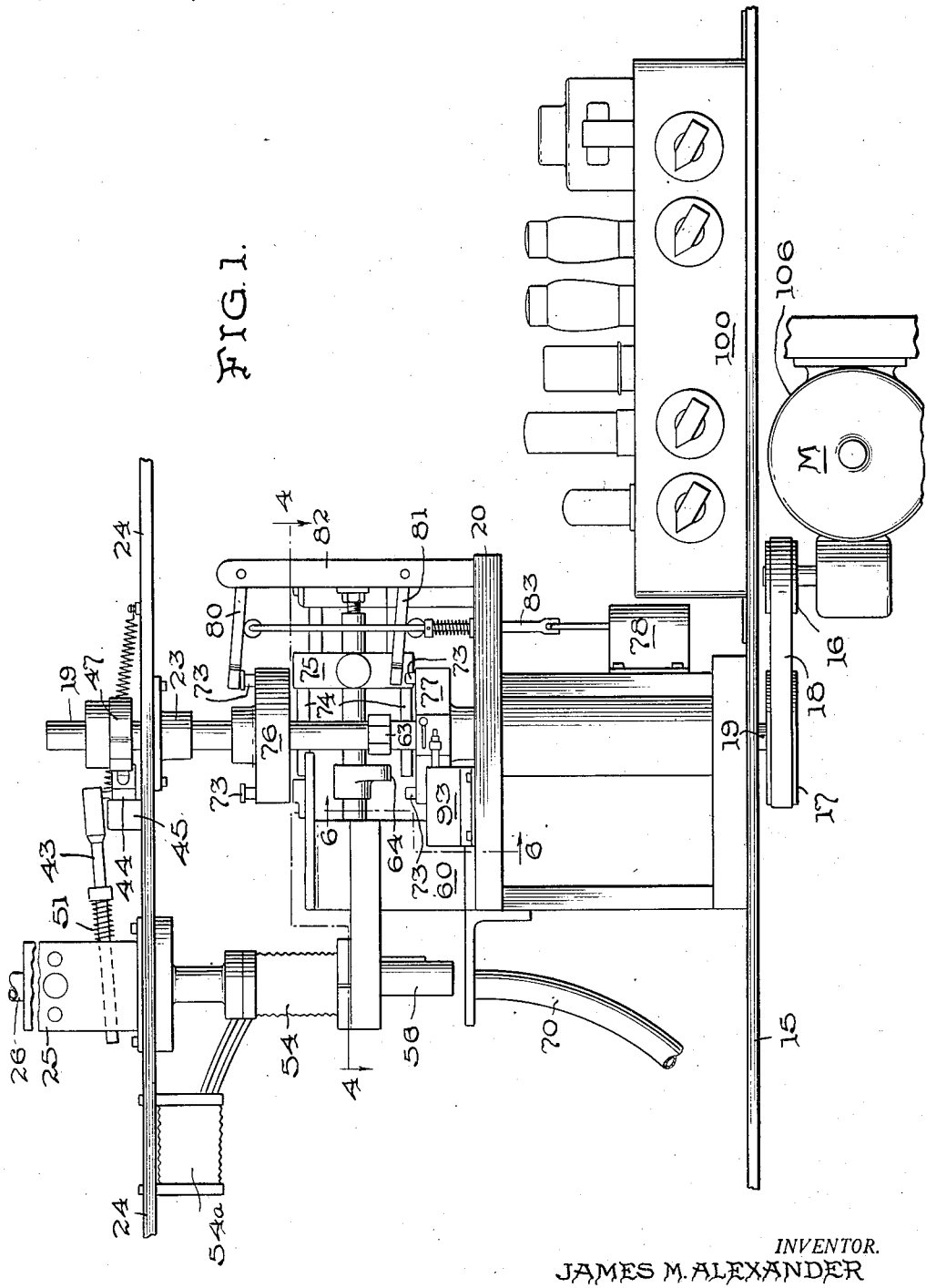
Figure 1 is a front elevational view of the apparatus comprising the present invention.

Referring to the drawings, numeral 15 designates a supporting frame for the apparatus comprising the present invention and beneath the frame, an electric gear motor M is mounted and receives power from a conventional outlet (not shown).

The motor M rotates at 43 R. P. M. and through pulleys 16 and 17 and a drive belt 18, drives the main shaft 19 at a speed of 25 R. P. M. The shaft is vertically mounted in a suitable bearing on the frame 15, passes up through an intermediate frame 20 and then through a bearing 23 fixed to an upper frame 24.

A test piece feeder device 25 is mounted at the left of the frame 24 (Figure 1) and receives test pieces from a feeder chute 26. As seen in Figure 7, the feeder 25 includes a vertical passage 27 for the test pieces opening into a cylindrical recess 28 which is adapted to receive a cylinder 29 having a hollow hub portion 30. The cylinder is also provided with a circular recess 33 for the reception of and cooperation with a tube 34 having opposed hub portions adapted to be journalled in the feeder body 25 and in the hollow hub 30. The inner diameter of the tube 34 is equal to that of the test piece passage 27 and to the width of a pair of almost diametrically opposed slots 35 and 36 in the peripheral wall of the cylinder 29.

The tube 34 is aligned with the passage 27 and clamped to the casing 25 by a screw 37 and functions to maintain a test piece in vertical position within the cylinder 29 as shown in Figure 8. The cylinder hub 30 is rotatably mounted on the outer hub of the tube 34 and retained thereon by a washer and screw 38, the former acting against a plate 39 which is fixed to the cylinder 29 by a pair of screws. A crank pin 40 is fixed to the lower portion of the plate 39 and its head receives one end of a pitman 43 which is adjustably connected thereto.

Referring to Figure 3, the other end of the pitman is pivotally connected to a striker arm 44 which is pivoted to the frame 24 as at 45. A follower block 46 is fixed to the striker arm intermediate its length, and its outer edge is gently arcuate and adapted to engage the outer periphery of the cam disc 47 which is fixed to the main shaft 19 and bears a pair of diametrically disposed cams 48. The follower block 46 is resiliently urged against the periphery of the cam disc 47 by means of a compression spring 51 mounted on the pitman 43 and acting between the crank pin 40 (Figure 7) and a collar 49 which is fixed to the pitman 43.

It will now be readily apparent that test pieces will be fed continuously to the feeder casing 25 from the chute 26 and that once every half revolution of the shaft 19, one of the cams 48 will strike the follower block 46 to move the pitman arm 43 to the left (Figure 3) to thus partially rotate the cylinder 29 to align its slot 36 with the bottom of the tube 34 and thus permit the test part in the tube and cylinder to drop downwardly into the test coil. It will be noted that the upper periphery of the cylinder 29 will prevent the next test piece from dropping into the cylinder until it has moved back counterclockwise (Figure 8) upon which the piece will be arrested by the bottom portion of the cylinder adjacent the slot 36, the counterclockwise motion of the cylinder, of course, being effected by the spring 51 acting between the crank pin 40 and the collar 49.

As seen in Figures 1 and 5, a test piece T upon dropping into the test coil 54, to be described in detail with the electronic circuits disclosed, is arrested by a stop 55 fixed to a distributor chute 56 which is fixed to a slidable and oscillatable shaft 57 mounted in a sleeve 59 supported by a bracket 60. The shaft 57 is moved to the left to release the test part from the coil 54 when either lobe of a double lobed cam 63 fixed to the rotating shaft 19 strikes the projection 64 fixed to the shaft 57. The shaft is moved back to the right by a tension spring 65 (Figure 4) connected between the stop 55 and one end of a bar 66 which is mounted on a tubular pivot 67 and has its other end connected to the right end of the shaft 57.

Depending upon the strength of the signal generated by the test part T in the coil 54, the distributor chute 56 is automatically rocked to a position of alignment with the upper end of one of three discharge chutes 68, 69 and 70 to grade or sort the parts in accordance with the signal resulting from its test. The rocking of the shaft 57 is effected by memory pins 73 striking either of the vertically spaced parallel arms 74 of a distributor block 75 fixed to the shaft 57 to the right of main shaft 19 (Figure 1).

Two memory pins each are diametrically mounted in an upper disc 76 and in a lower disc 77 both of which are fixed to the main shaft 19 and rotate therewith. If a memory pin 73 in the disc 76 projects below it, it will strike the upper arm 74 knocking it away and causing the shaft 57 to rock counterclockwise as viewed from the left end of Figure 1 to align the chute 56 with the discharge chute 70. If a memory pin projects above the disc 77, it will strike the lower bar to rock the shaft 57 in a clockwise direction to align the chute 56 with the discharge chute 68. If no memory pin strikes either arm 74, the chute 56 remains aligned with the center discharge chute 69.

The position of the memory pins 73 in their discs is controlled by a pair of solenoids 78 and 79 fixed to a bracket supporting the right end of the frame 20. In response to the strength of the signal from the pickup coil 54, the solenoids work separately or together to pull down upper and lower striker arms 80 and 81 to which they are pivotally connected respectively by rods 83 and 84, the rods 80 and 81 being pivotally mounted on a bracket 82.

As seen in Figure 6, each memory pin 73 fits the memory pin receiving bores 85 of the memory pin discs 76 and 77 very snugly so as to hold their adjusted position by friction. It will be apparent that when solenoid 79 is energized, it will pull down the lower striker arm 81 to depress the memory pin thereof in the lower disc 77, the depressed position being shown in dotted lines (Figure 6). Solenoid 78, when energized, operates in a similar manner to depress the memory pin in the upper disc 76. The memory pins 73 are returned to their raised positions as shown in full lines, by means of an upper incline 86 (Figure 2) for the memory pins of disc 76 and a lower incline 87 fixed to the frame 20 for the lower memory pin disc 77 (Figure 6).

It will be noted that the outer upper periphery of the disc 77 bears a pair of diametrically opposite slightly raised cam portions 88 terminating (Figure 4) in a raised cam 89 which is adapted to strike the roller of the operating arm 90 of a pair of microswitches 93 whose purpose is to ground the signal voltage in the amplifier 100 during the part of the cycle in which the apparatus is changing test parts in the pickup coil 54.

Figure 11:
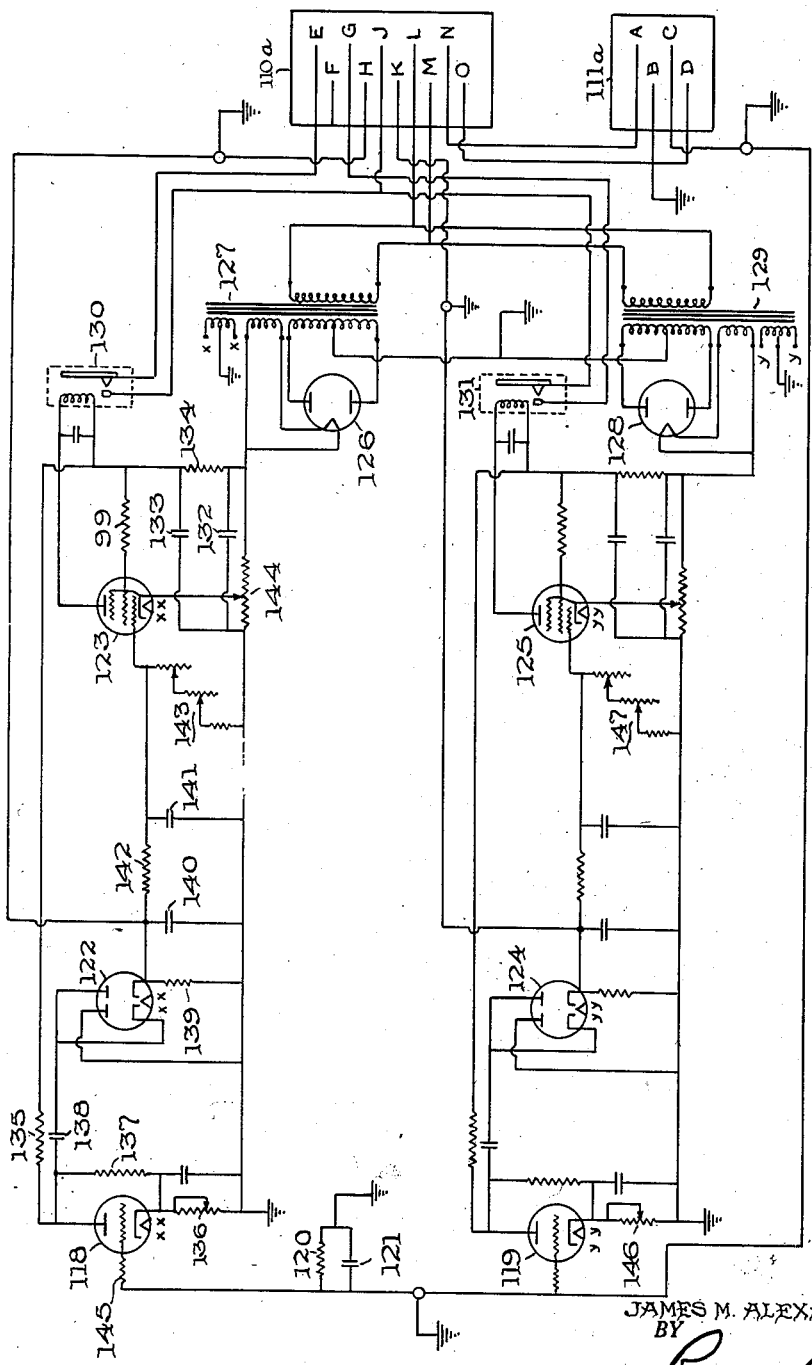
Figure 11 is a schematic diagram illustrating a preferred embodiment of a multi-channel amplifier suitable for actuating the sorting and signalling means of the present invention.

When the microswitches are open, the amplified signal voltage will be applied to the grids of the output tubes 123 and 125 (Figure 11). The amount of signal voltage present when the microswitches open, determines the amount of plate current that these tubes will draw and if enough current flows to energize the plate relays, the solenoids are energized.

Electrical circuit and operation

Figure 9:
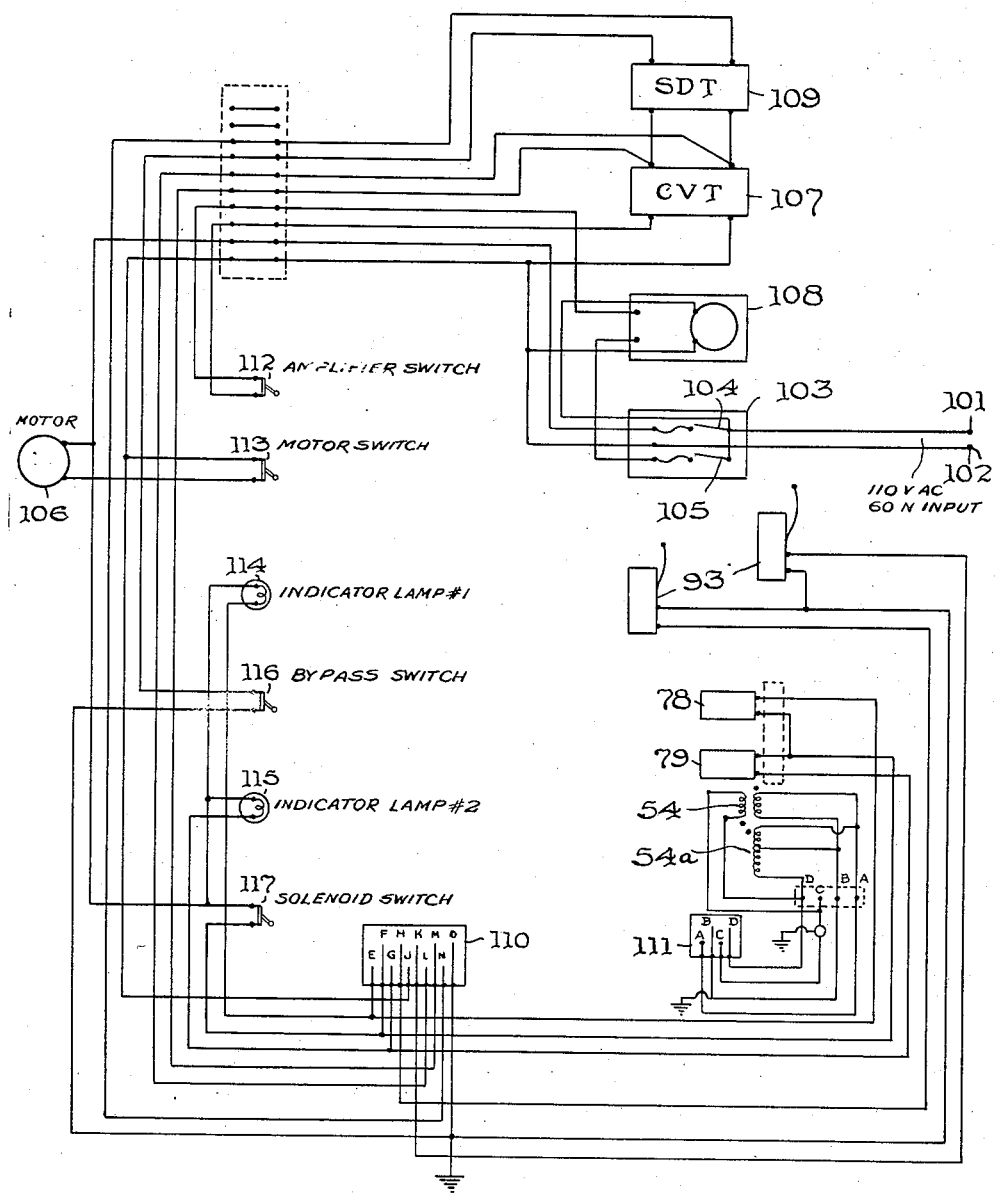
Figure 9 is a diagram of the circuit forming a part of the present invention.

Referring to Figures 9, 10 and 11 of the drawings, a description of the electrical control circuits and the electronic amplifier circuits will now be given. A detailed description of the operation of these circuits will follow below.

As shown in Figure 9, terminals 101 and 102 are provided for connecting the electric circuit to a convenient source of power, which may be 110 volts, 60 cycle, single-phase alternating current. A disconnect switch element 103 is provided, which suitably may be of the 2 pole, double-fused type with a third unfused terminal strip. Pole 104 may be conveniently fused with a 20 ampere capacity fuse to afford protection for the main drive motor 106 and the solenoids 78 and 79. The other pole, 105, may be fused with a one ampere capacity fuse to afford protection for the constant voltage transformer 107 and its associated circuits. A time clock switch 108 is provided to energize the constant voltage transformer and its associated circuits for a warm up period prior to operation. The time clock may be of the constant running type which actuates a set of points to the "on" or "off" position. It may be set to turn these switch points on at any predetermined time and to later turn them off at any time within a 24-hour range. This cycle may be repeated automatically every 24 hours.

A constant voltage transformer 107 is used to regulate the input line voltage applied at terminals 101 and 102 to remove any undesirable fluctuations therefrom. The output of constant voltage transformer 107 supplies the power for the amplifier 100, and also energizes a step-down transformer 109 whose secondary voltage may conveniently furnish a voltage of approximately 3 volts which is used to energize the primary of the testing coil 54 (Figures 1, 5 and 9) and ballast coil 54a. The regulated 110 volt output is supplied to amplifier 100 by means of a 10 contact "Jones" plug 110 which plugs into receptacle 110a (Figure 11). A similar plug 111 is provided to interconnect the pick up coil 54 to receptacle 111a, Figure 11, on amplifier 100.

An amplifier switch 112 is provided to connect or disconnect the input voltage to the constant voltage transformer, and thus connect or disconnect the constant output voltage which is applied to energize the amplifier 100. This switch is actuated by the time clock switch 108, as will be apparent from a study of the diagram. The motor switch 113 is additionally provided to manually govern the operation of the main drive motor 106. Elements 114 and 115 are incandescent indicator lamps which are used to furnish a visual indication of whether solenoids 78 and/or 79 are activated. Each lamp is connected in parallel with its respective solenoid; hence, when a solenoid is energized, the indicator lamp in parallel with it will light.

A normally closed bypass switch 116 may be used to turn on or off the voltage furnished to the testing and ballast coils. This switch is indicated as being placed in the 3 volt A. C. line between the output of the transformer 109 and the input through the plug element 110 into receptacle 110a of amplifier 100.

When the machine is initially set up to operate as a "go-no-go" sorting gauge, as a convenience to the operator it may be preferred that the standard test item which is inserted in the associated testing coil 54 be not diverted into the several sorting chutes. A solenoid disconnect switch 117 is provided to deenergize the solenoids when thus setting up the machine on a standard test part, although visual indication is provided during the adjustment step by the indicator lamps 114 and 115.

Testing coil 54 and ballast coil 54a shown in Figure 9 will now be explained in greater detail. Figure 10 shows to an enlarged scale, the interrelation of the testing coil and the ballast coil. As shown in the latter figure, primary and secondary windings 118 and 119, respectively, of the testing coil 54 are interlinked by a flux path. The flux path is modified as aforesaid by the introduction into the core of testing coil 54 of the test part T. As described previously, an auxiliary ballast coil 54a is provided to increase the sensitivity and therefore the accuracy of the selection or sorting step.

The ballast coil 54a is of the auto transformer type and its output voltage is of the same phase as the output voltage of 119 of the testing coil. As indicated in Figure 10, however, the output of ballast coil 54a is connected in reverse phase with the secondary coil 119.

The purpose of this interconnection and the manner in which it increases the sensitivity of the resultant testing pulse which actuates amplifier 100 will now be explained. The variation in the output of secondary winding 119 results from the degree of hardness or physical properties of the test part which forms the core of testing coil 54. The variation in the voltage from secondary coil 119 is retained by the method of balancing out of the signal circuit part of such voltage, thereby giving a higher proportional variation in input voltage to the amplifier.

To illustrate this point in one embodiment of the present invention, the output variation in the voltage from testing coil 54 ranged from 3.1 to 3.8 volts for various test pieces. A fixed bucking voltage from coil 54a of 2.3 volts was applied, resulting in a signal output variation to the amplifier 100 of 0.8 to 1.5 volts which is a greater variation than 3.1 to 3.8 volts thereby resulting in more sensitivity.

A preferred embodiment of amplifier 100 is shown in Figure 11 wherein the ten-terminal and four-terminal socket elements 110a and 111a respectively are provided to interconnect the amplifier with the circuitry of Figure 9. Terminals A, B, C and D on element 111a interconnect coils 54 and 54a with the amplifier. It will be noted from an inspection of the diagrams of Figures 9 and 11, that terminal A furnishes a 3 volt A. C. low voltage input to testing coil 54 while terminals C of 111 of Figure 9 furnishes the output from said coil to terminal C of 111a (Figure 11) of amplifier 100. This signal input voltage is fed into the grids of the first or preamplifier stages comprising tubes 118 and 119 through a filter network consisting of resistor 120 and condenser 121 suitably chosen of such a magnitude as to eliminate any undesirable signals from sources other than the pick up coil. Amplifier 100 is a multichannel device having a first channel including preamplifier stage, tube 118, the rectifier or detector stage including tube 122, and a final output stage including tube 123. The second channel of the amplifier includes input tube stage 119, detector or rectifier stage 124 and output stage 125. Separate power supplies are provided for each of the two channels of the amplifier to insure adequate stability of operation. Each power supply stage includes the usual high voltage transformer which is additionally provided with low filament voltage windings as indicated in the diagram. Rectifier 126 and transformer 127 furnish the power to the first channel, while rectifier 128 and transformer 129 supply the second channel. The input source for transformers 127 and 129 is supplied over the ten-terminal plug 110, Figure 9 and socket 110a, Figure 11 which furnishes the constant voltage output from transformer 107 in Figure 9.

The first channel of amplifier 100, described above as including vacuum tubes 118, 122 and 123 (Fig. 11), terminates in plate circuit relay 130 which, when actuated by a predetermined signal input, energizes solenoid 79 (Figures 2 and 9) to position "selector chute 56" (Figures 1 and 5) in the manner aforedescribed. The second amplifier channel including tubes 119, 124 and 125 similarly terminates in a plate circuit relay 131 which is used to energize solenoid 78.

Tube 126 is arranged to provide full-wave rectification of the high-voltage output of transformer 127. Direct-current voltage at the cathode of the dual-diode tube 126 is first filtered in the conventional manner by the combination of condensers 132 and 133 and resistor 134. The filtered voltage is applied as the plate potential to the output stage 123 through plate relay 130; through dropping resistor 135 to tube 118; and through resistor 99, to the screen grid of tube 123.

Tube 118, which is a preamplifier or voltage amplifier of the input signal from the secondary winding 119 of testing coil 54, has a cathode variable resistor 136 of a relatively large magnitude. Such variable resistor furnishes a "self-bias" for the preamplifier stage and insures that the amplifier will accept a wide range of input signal values corresponding to a wide variation in the hardness or other qualities of the test part under inspection. To assist in this purpose, grid limiting resistor 145 may optionally be included. The cathode resistor 136 is indicated as being of the variable potentiometer type. The resistor is adjusted upon the initial set-up of the machine with a standard test part as a "coarse" adjustment of the selector actuation.

The output of the preamplifier at load resistor 137 is capacitively coupled through condenser 138 to the detector circuit which includes the dual-diode tube 122 and load resistor 139. The output voltage across resistor 139, after suitable smoothing in the filter circuit comprising condensers 140 and 141 and resistor 142, is applied to the input grid of the final output stage which includes tube 123. A bank of variable resistors, indicated generally at 143, is provided to effect the "fine" adjustment of the selector actuation. Additionally, a tapped resistor 144 is bridged across the output of power supply 126—127 and is initially adjusted to establish the proper bias so that tube 123 is normally cut off or non-conducting in the absence of an input signal of a predetermined magnitude to its grid. Plate relay 130 is thus normally open and will only be actuated to close its contacts upon the application of a sufficiently large signal to the input grid of tube 123.

It will now be noted that terminal H of socket element 110a is connected to the junction point of the detector load resistor 139 and the filter 140—141—142. The cam-actuated microswitch 93 periodically places terminal H at ground potential during the time interval that the feeder system is passing a new test part into testing coil 54. Therefore, during this loading interval the grid of output stage 123 is effectively grounded for any signal input and rendered non-responsive to possible erroneous signals which may be generated during the loading step or advancement of the next test part into the testing coil.

The second channel of amplifier 100 is similar in all respects to the above described first channel. It differs only to the extent that the elements of the "coarse" potentiometer 146 and the "fine" variable resistor bank 147 are adjusted so that an input signal of different magnitude is necessary in order to pass through this second channel than through the first. Thus, while input signals of a certain predetermined magnitude will actuate plate relay 130, signals of a somewhat different magnitude are required to effect the closing of plate relay 131.

As indicated previously, an important principle in the selective non-destructive gauging of hardness, defects or similar properties of metallic objects according to the present invention, is the application of the relation between the permeability of the object by electromagnetic lines of force and the physical properties thereof. The harder the object or part under inspection, the less permeable it will be, and therefore a lesser voltage will be induced in secondary winding 119 (Figure 10) of testing coil 54 (Figures 1, 5 and 9), and there will thus be a lesser input voltage available to amplifier 100.

According to this principle, the signal input response level of the first and second channels of the amplifier is so adjusted that parts of the greatest hardness will not generate signals of sufficient magnitude to pass through either of the amplifier channels, parts of a lesser degree of hardness will generate a signal of sufficient magnitude to pass through the first amplifier channel and actuate plate relay 130, while parts of a still lesser degree of hardness will generate signals which pass through both amplifier channels and actuate both relays 130 and 131.

In a similar manner, according to the degree of defects present in the part under test, either no relay actuation will take place, or relay 130 alone will close, or both relays 130 and 131 will close to effect the desired alignment of sorting element 56 with the proper discharge chute.

In following the principles of the present invention, the particular values of the majority of the circuit elements of the embodiment of amplifier 100 shown in Figure 11 are not critical and may well vary according to the particular operating characteristics of the several electronic tube types utilized therein in the known manner. The input filter elements, comprising resistor 120 and condenser 121, must be of such a value as to render the system non-responsive to spurious input signals at other than the sampling rate of the apparatus. Additionally, cathode resistors 136 and 146 are preferably of a sufficient magnitude to insure against overdriving the input grid of the first stages by strong input signals.

Although the invention is not limited to electronic tubes of a particular type, preferably, for the sake of obtaining sufficient power to control the operation of the plate relays of amplifier 100, the output stage tubes 123 and 125 may be electronic tubes of the pentode type.

In one particular construction of amplifier 100 the following circuit elements were utilized in the first amplifier channel. Corresponding elements in the second amplifier channel were of identical values:

| | |
|---|---|
| Resistor 120 | 2200 ohms. |
| Condenser 121 | 0.1 mfd. |
| Resistor 145 | 2200 ohms. |
| Tube 118 | 6SL7. |
| Potentiometer 136 | 10,000 ohms. |
| Resistor 137 | 220,000 ohms. |
| Resistor 135 | 47,000 ohms. |
| Condenser 138 | 0.1 mfd. |
| Tube 122 | 6AL5. |
| Resistor 139 | 1.2 megohms. |
| Condensers 140, 141 | 0.05 mfd. |
| Resistor 142 | 470,000 ohms. |
| Resistor bank 143 | 500,000 ohm pot. 50,000 ohm pot. 33,000 ohm fixed. |
| Tube 123 | 65J7. |
| Resistor 144 | 10,000 ohms, tapped 50 watts. |
| Condensers 132, 133 | 30 mfd. |
| Resistor 134 | 450 ohms. |
| Tube 126 | 5V4G. |

*Operation*

In the use of the apparatus in the testing of a particular test piece T, the particular form for the reception of the test piece in question forms a base upon which the test coil 54 is wound and this is mounted in its operative position as shown in the drawings. After a warm up period, the apparatus is adjusted for the proper sorting of the pieces in accordance with the characteristics of a standard test piece to be tested for hardness or defects and the motor M is then turned on. As stated, the higher the degree of hardness of the part of item under inspection, the lesser the voltage which will be transformed from the primary of the pickup coil to the secondary. This same principle is employed in the detection of defects within or in the surface of the parts being tested.

The apparatus is, of course, intended for the automatic testing of thousands of presumably similar pieces which are now continuously fed to the apparatus by means of the feeder chute 26. The rotation of shaft 19 will act through the cams 48 on the disc 47 against the follower block 46 of the striker arm 44 to rotate the feeder cylinder 29 to admit one test piece at a time to the test coil 54 from the feeding device 25. Inasmuch as the shaft 19 is rotating at 25 R. P. M. and the test piece feeder cylinder 29 is actuated twice a revolution, fifty test pieces per minute may be inspected and tested by the apparatus thus allotting a test period of about one and one-fifth seconds per piece including the movement of the piece to and from the test coil 54.

If not enough signal voltage is present during the inspection period to energize either solenoid 79 or 78, the memory pin 73 in the lower memory pin disc 77 hits the lower arm of the distributor block 75 pushing it away as seen in Figure 1. This lines the distributor chute 56 (Figure 5) up with the discharge chute 68 (Figure 7) upon which the lobe of the cam 63 (Figure 6) moves the slide 55 (Figure 5) to the left permitting the test piece T to fall out of the pickup coil 54 and drop down the discharge chute 68.

If an adequate amount of signal voltage is present during the inspection period to energize 130 but not 131, solenoid 79 is energized and pulls down the striker arm 81 to push the memory pin 73 in memory pin disc 77 to the down position (Figure 6) where it cannot strike the lower arm and permits the distributor block 75 to remain in its vertical position so that the distributor chute 56 remains aligned with the central discharge chute 69, a lobe of the cam 63 striking the projection 64 to slide the shaft 57 to the left (Figure 5) to permit the test part T to drop out of the test coil 54 through the distributor chute 56 and down the discharge chute 69.

If an adequate amount of signal voltage, as a result of the test on the test piece in the pickup coil 54, is present to energize both 130 and 131, both solenoids 79 and 78 are energized to pull down respectively, striker arms 81 and 80 to push down a memory pin 73 in each of the memory discs 77 and 76 to permit the memory pin in the disc 76 to hit the upper arm of the distributor block 75 and move the distributor chute 56 to alignment with the discharge chute 70. Thereupon, a lobe of the cam 63 strikes the projection 64 on the sliding shaft 57 to release the test piece through the distributor chute 56 and into the discharge chute 70.

It is to be understood that the form of the invention herewith shown and described is to be taken as a preferred example of the same and that various changes in the shape, size and arrangement of parts may be resorted to without departure from the spirit of the invention of the scope of the subjoined claims.

I claim:

1. An apparatus for electrically testing and sorting metallic parts for hardness, defects, etc. comprising a frame including intermediate and upper portions, a drive shaft rotatably mounted in said frame, vertically arranged electrical testing means having a hollow core and adapted to emit a test signal mounted on said intermediate frame portion, means on said upper frame portion for feeding parts to said core by gravity upon rotation of said shaft, means on said frame for supporting parts in said core, and a plurality of discharge chutes mounted on said frame, said supporting means including a distributor chute having one end in alignment with said core and being movable in response to said signal to align its other end with a predetermined one of said discharge chutes as determined by the hardness of the part and the resultant strength of said signal.

2. An apparatus as recited in claim 1 wherein said feeding means is constructed and arranged to feed parts to said core at regularly spaced intervals.

3. An apparatus as recited in claim 1 wherein said feeding means comprises a chute, a rotatable cylinder including a pair of slots mounted in said chute to simultaneously block and open said chute adjacent said cylinder at diametrically opposite points, a cam mounted on said shaft, and linkage means oscillatable by said cam and connected to said cylinder to open and block said chute at said points to permit the passage of a single part.

4. An apparatus as recited in claim 1 wherein said part supporting means is constructed and arranged to release a part from said core at regularly spaced intervals.

5. An apparatus as recited in claim 1 wherein said part supporting means comprises a stop partially closing the bottom of said core, a shaft slidably mounted in said frame supporting said stop at one of its ends and a projection at its other end, and a cam mounted on said driving shaft and adapted to strike said projection to slide said slidable shaft to move said stop to open said core for gravity discharge of a part therefrom.

6. An apparatus as recited in claim 1 wherein said distributor chute is constructed and arranged to oscillate about its said one end.

7. An apparatus as recited in claim 1 wherein said electric testing means includes means for indicating the strength of said signal.

8. An apparatus as recited in claim 1 wherein said electric testing means includes means for visually indicating the strength of said signal.

9. An apparatus as recited in claim 1 wherein an electronic circuit is provided for amplifying said signal.

10. An apparatus as recited in claim 9 wherein said signal is calibrated to the signal of a standard part and includes means for indicating conformance therewith and deviations therefrom.

References Cited in the file of this patent

UNITED STATES PATENTS

| | | |
|---|---|---|
| 1,663,539 | Bellinger | Mar. 27, 1928 |
| 2,234,456 | Schuarte | Mar. 11, 1941 |
| 2,237,254 | Brockhuysen | Apr. 1, 1941 |
| 2,448,652 | Aller | Sept. 7, 1948 |
| 2,566,767 | Hunt | Sept. 4, 1951 |
| 2,630,221 | Stewart | Mar. 3, 1953 |
| 2,645,341 | Diamond | July 14, 1953 |